United States Patent
Wilson et al.

(10) Patent No.: US 10,767,466 B2
(45) Date of Patent: Sep. 8, 2020

(54) ACTIVE RANGING-WHILE-DRILLING WITH MAGNETIC GRADIOMETRY

(71) Applicant: Halliburton Energy Services, Inc., Houston, TX (US)

(72) Inventors: Glenn Andrew Wilson, Houston, TX (US); Paul F. Rodney, Spring, TX (US); Akram Ahmadi Kalateh Ahmad, Bedford, MA (US); Hsu-Hsiang Wu, Sugarland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/546,235

(22) PCT Filed: Jan. 10, 2017

(86) PCT No.: PCT/US2017/012873
§ 371 (c)(1),
(2) Date: Jul. 25, 2017

(87) PCT Pub. No.: WO2017/139058
PCT Pub. Date: Aug. 17, 2017

(65) Prior Publication Data
US 2018/0334899 A1    Nov. 22, 2018

Related U.S. Application Data (60) Provisional application No. 62/294,810, filed on Feb. 12, 2016.

(51) Int. Cl.
*E21B 47/0228* (2012.01)
*G01C 21/20* (2006.01)
(Continued)

(52) U.S. Cl.
CPC ........ *E21B 47/0228* (2020.05); *E21B 47/022* (2013.01); *G01C 21/20* (2013.01); *E21B 43/2406* (2013.01); *E21B 47/18* (2013.01)

(58) Field of Classification Search
CPC .. E21B 47/02216; E21B 47/022; E21B 47/18; E21B 43/2406; G01C 21/20
See application file for complete search history.

(56) References Cited

U.S. PATENT DOCUMENTS

| 3,617,865 A | * | 11/1971 | Hakata | .................. G01V 3/104 |
| | | | | 324/326 |
| 6,714,870 B1 | * | 3/2004 | Weston | ................. E21B 47/022 |
| | | | | 702/6 |

(Continued)

FOREIGN PATENT DOCUMENTS

| CA | 2276823 C | 1/2000 |
| WO | 2012134468 | 10/2012 |
| WO | 2015099673 | 7/2015 |

OTHER PUBLICATIONS

Clark, Integrated Magnetics: Contributions to Improved Processing and Interpretation of Magnetic Gradient Tensor Data, New Methods for Source Location and Estimation of Magnetisation, and Predictive Magnetic Exploration Models, Doctoral Thesis, Macquarie University, 2014 (Year: 2014).*

(Continued)

*Primary Examiner* — Daniel R Miller
(74) *Attorney, Agent, or Firm* — Jason Sedano; C. Tumey Law Group PLLC (57) ABSTRACT

Systems and methods for active ranging-while-drilling (ARWD) for collision avoidance and/or well interception. A method for ranging while drilling may comprise employing a rotating magnet assembly to induce a changing magnetization and/or electric current in a conductive member disposed in a target wellbore, wherein the rotating magnet (Continued)

assembly may be employed in a second wellbore; measuring at least one component of a magnetic gradient tensor using receivers; and calculating a relative location of the conductive member based at least in part on the measurements of the at least one component of the magnetic gradient tensor.

14 Claims, 7 Drawing Sheets

(51) Int. Cl.
*E21B 47/022* (2012.01)
*E21B 43/24* (2006.01)
*E21B 47/18* (2012.01)

(56) References Cited

U.S. PATENT DOCUMENTS

| | | |
|---|---|---|
| 7,482,804 B2 | 1/2009 | Tilbrook et al. |
| 7,508,202 B2 | 3/2009 | Tilbrook |
| 8,229,688 B2 | 7/2012 | Clark |
| 8,294,468 B2 | 10/2012 | Reiderman |
| 9,121,967 B2 | 9/2015 | Le et al. |
| 9,151,150 B2 | 10/2015 | Fang et al. |
| 2006/0028321 A1* | 2/2006 | Kennedy ........... E21B 47/02216 340/385.1 |
| 2010/0169018 A1 | 7/2010 | Brooks |
| 2011/0144472 A1 | 6/2011 | Zhdanov |
| 2013/0173164 A1* | 7/2013 | Zhang ...................... G01V 3/28 702/6 |
| 2013/0228375 A1 | 9/2013 | Hallundbaek |
| 2014/0111210 A1 | 4/2014 | Fang et al. |
| 2014/0312904 A1* | 10/2014 | Mizuno .................. G01V 3/104 324/326 |
| 2014/0345856 A1 | 11/2014 | Elmbo |

OTHER PUBLICATIONS

International Search Report and Written Opinion for Application No. PCT/US2017/012873 dated Apr. 18, 2017.
Advantages of Measuring the Magnetic Gradient Tensor by Schmidt et al dated Apr. 2000.
The magnetic gradient tensor: Its properties and uses in source characterization by Schmidt et al dated Jan. 2006.
Advanced Superconducting Gradiometer/Magnetometer Arrays and a Novel Signal Processing Technique by Wynn et al. dated Mar. 2, 1975.
Examination Report for CA Application No. 3,007,717, dated Mar. 6, 2019.

\* cited by examiner

ACTIVE RANGING-WHILE-DRILLING WITH MAGNETIC GRADIOMETRY

BACKGROUND

Wellbores drilled into subterranean formations may enable recovery of desirable fluids (e.g., hydrocarbons) using a number of different techniques. Knowing the location of a target wellbore may be important while drilling a second wellbore. For example, in the case of a target wellbore that may be blown out, the target wellbore may need to be intersected precisely by the second (or relief) wellbore in order to stop the blow out. Another application may be where a second wellbore may need to be drilled parallel to the target wellbore, for example, in a steam-assisted gravity drainage ("SAGD") operation, wherein the second wellbore may be an injection wellbore while the target wellbore may be a production wellbore. Yet another application may be where knowledge of the target wellbore's location may be needed to avoid collision during drilling of the second wellbore.

Electromagnetic ranging tools may be employed in subterranean operations to determine direction and distance between two wellbores. Electromagnetic ranging tools may use different techniques to obtain current on a conductive member (e.g., a casing string) in the target wellbore. Approaches may include directly injecting a current into the conductive member and/or inducing a current on a conductive member by transmitting electromagnetic fields by coil antennas positioned in a second wellbore. The induced current in turn may cause the casing to radiate a secondary electromagnetic field. In another approach, an electrode type source may be used to induce current on the conductive member. The gradient of the magnetic field radiated by the conductive member in addition to the magnetic field itself may be measured. Using a relationship between the magnetic field and its gradient, a ranging measurement may be calculated. Alternatively, an inversion may be used to determine the range, in which a forward model of the signal that may be received at the ranging tool may be needed. The inversion process may try to find the formation and well parameters that would match the forward model with the measurements made by the tool.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to systems and methods for Active Ranging-While-Drilling ("ARWD") for collision avoidance and/or well interception. This disclosure may relate to methods of measuring data to calculate the range and direction from a bottom-hole-assembly ("BHA") to at least one adjacent (or target) well.

Systems and methods of the present disclosure may include a magnet assembly (e.g., permanent and/or electro-), and at least one receiver; both may be packaged in a BHA. At least one receiver may include a magnetic gradiometer and be capable of measuring at least one independent component of the magnetic gradient tensor and/or at least one vector component of the magnetic field.

ARWD technologies for collision avoidance and/or well interception may require access to a target well, whether via a wireline-deployed intervention tool or surface excitation. The active source may be magnetic, electromagnetic, and/or acoustic, with corresponding sensors in an adjacent well. However, in many drilling applications, access to the adjacent well for excitation may not be possible. Thus, an ARWD system capable of being deployed from a BHA that may measure data to calculate a range and direction from the BHA, to at least one adjacent well, may be desired.

Systems and methods of the present disclosure may include the use of a magnetic gradiometer sensor, whether used as a standalone sensor system, or combined with a magnetic field sensor. Additionally, the processing techniques of the present disclosure may be implemented as either a stand-alone software, integrated as part of a commercial survey/navigation/collision avoidance software, or integrated asset modeling software through an application programmable interface ("API"). Systems and methods of the present disclosure may include operation of an electromagnetic ranging tool entirely from a BHA, and may not require intervention of an adjacent target well. Systems of the present disclosure may have sensitivity to adjacent target wells greater than about 10 meters from the BHA, and may be operated in real-time, including downhole processing for a range and direction to a target well. Permanent magnet assemblies may offer a low cost magnetization source that may be deployed behind a bit, and may not require a short hop telemetry to the BHA above the mud motor. The electromagnetic ranging tool may have negligible sensitivity to the magnetic properties of the BHA and/or the drill bit. The electromagnetic ranging tool may be operated in real-time, including downhole processing for a range and direction to a target well, which may allow integration with survey data.

Figure 1:
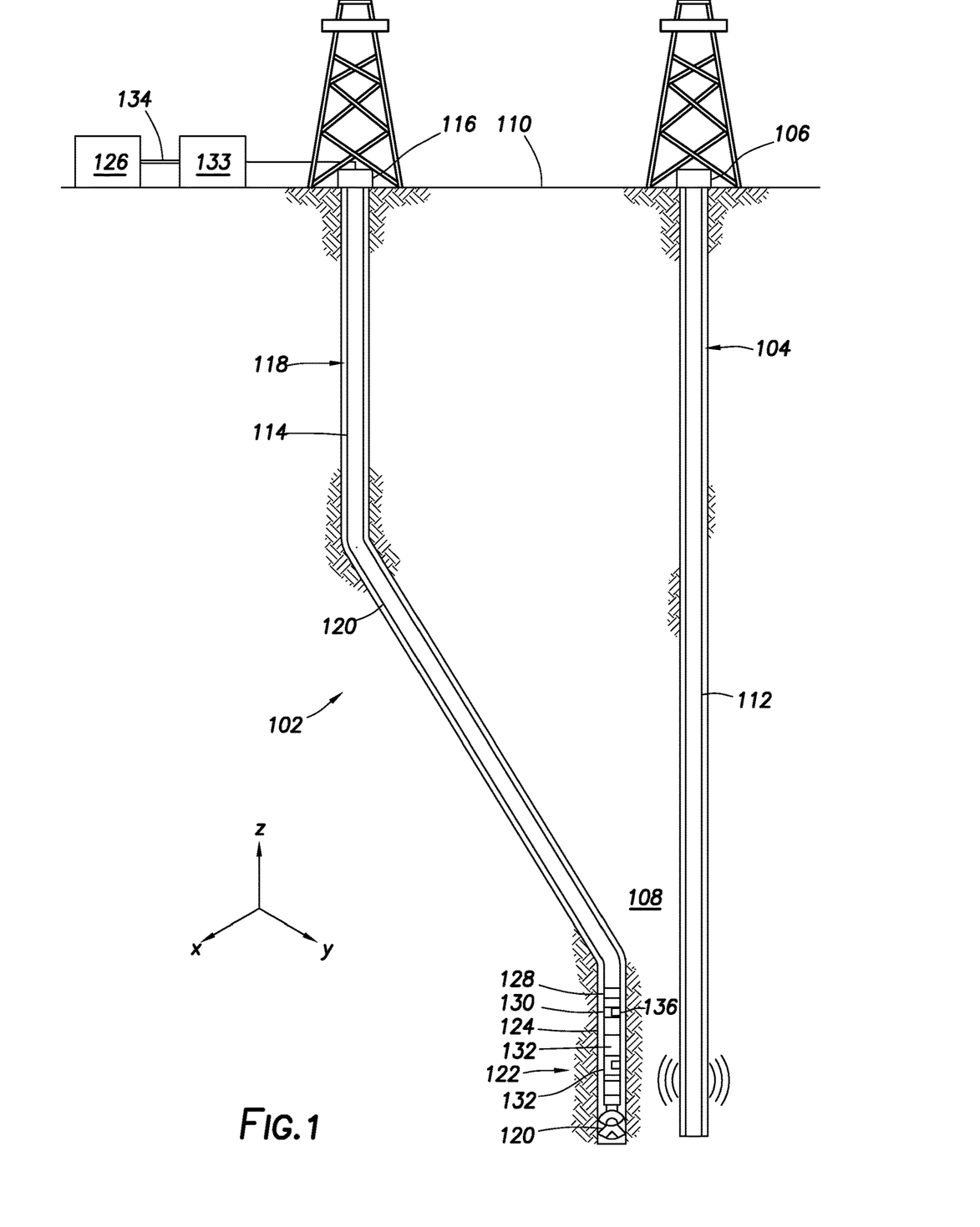
FIG. 1 is a schematic illustration of an example of an electromagnetic ranging system in a wellbore.

FIG. 1 is a schematic illustration of an electromagnetic ranging system 102. As illustrated, a target wellbore 104 may extend from a first wellhead 106 into a subterranean formation 108 from a surface 110. Generally, target wellbore 104 may include horizontal, vertical, slanted, curved, and other types of wellbore geometries and orientations. Target wellbore 104 may be cased or uncased. A conductive member 112 may be disposed within target wellbore 104 and may comprise a metallic material that may be conductive and/or magnetic. By way of example, conductive member 112 may be a casing string, liner, tubing, or other elongated steel tubular disposed in target wellbore 104. Determining the position and direction of target wellbore 104 accurately and efficiently may be required in a variety of applications. For example, target wellbore 104 may be a "blowout" well. Target wellbore 104 may need to be intersected precisely by a second wellbore 114 in order to stop the "blowout." Alternatively, it may be desired to avoid collision with target wellbore 104 in drilling second wellbore 114 or it may be desired to drill the second wellbore parallel to the target wellbore 104, for example, in SAGD applications. In examples, target wellbore 104 may not be accessible and/or information about the position and structure of target wellbore 104 may not be available. As will be discussed in more detail, electromagnetic ranging system 102 may be used for determining the location of target wellbore 104 with respect to second wellbore 114.

With continued reference to FIG. 1, second wellbore 114 may also extend from a second wellhead 116 that extends into subterranean formation 108 from surface 110. Generally, second wellbore 114 may include horizontal, vertical, slanted, curved, and other types of wellbore geometries and orientations. Additionally, while target wellbore 104 and second wellbore 114 are illustrated as being land-based, it should be understood that the present techniques may also be applicable in offshore applications. Second wellbore 114 may be cased or uncased. In examples, a conveyance 118 may begin at second wellhead 116 and traverse second wellbore 114. Conveyance 118 may include wireline, slickline, coiled tubing, pipe, drill pipe, downhole tractor, or the like, which may provide mechanical suspension, as well as electrical connectivity, for electromagnetic ranging tool 124. As illustrated, conveyance 118 may be in the form of drill pipe. A drill bit 120 may be attached to a distal end of conveyance 118 and may be driven, for example, either by a downhole motor and/or via rotation of conveyance 118 from surface 110. Drill bit 120 may be a part of BHA 122 at distal end of conveyance 118. While not illustrated, BHA 122 may further comprise one or more of a mud motor, power module, steering module, telemetry subassembly, and/or other sensors and instrumentation as will be appreciated by those of ordinary skill in the art. BHA 122 may be a measurement-while drilling (MWD) or logging-while-drilling (LWD) system.

Electromagnetic ranging system 102 may comprise an electromagnetic ranging tool 124. Electromagnetic ranging tool 124 may be a part of BHA 122. Electromagnetic ranging tool 124 may be used for determining a distance and direction to target wellbore 104. Electromagnetic ranging tool 124 may comprise at least one transmitter 130 and/or at least one receiver 132. Receiver 132 may include magnetic field sensors such as, for example, magnetic gradiometers, atomic magnetometers, diamond magnetometers, MEMS magnetometers, and/or string magnetic gradiometers. It should be noted that electromagnetic ranging tool 124 may comprise a plurality of transmitters 130 and/or a plurality of receivers 132. At least one transmitter 130 and at least one receiver 132 may be disposed along a longitudinal axis of the electromagnetic ranging tool 124. At least one transmitter 130 may include a magnetic source, such as a magnet assembly 136 (e.g., containing permanent and/or electro-magnets), capable of inducing a magnetization or electric current in conductive member 112 disposed in target wellbore 104. Even if target wellbore 104 is not magnetic, magnet assembly 136 may induce a time varying electric current in target wellbore 104. If target wellbore 104 is magnetic, a time varying magnetic moment may also be induced in it.

At least one receiver 132 may be capable of measuring at least one independent component of the magnetic gradient tensor, and/or at least one vector component of the magnetic field. Additional sensors may be provided that are capable of providing a signal indicative of a rotational orientation of the magnetic source (e.g., magnetic assembly 136).

Systems and methods of the present disclosure may be implemented, at least in part, with an information handling system 126 which may be located at the surface 110 and/or downhole information handling system 128 which may be located on electromagnetic ranging tool 124. Electromagnetic ranging tool 124 may be connected to and/or controlled by information handling system 126 and/or downhole information handling system 128. Transmission of electromagnetic fields by a transmitter 130 and the recordation of signals by receivers 132 may be controlled by information handling system 126 and/or downhole information handling system 128. Information handling system 126 may transmit information to electromagnetic ranging tool 124 and may receive as well as process information recorded by electromagnetic ranging tool 124. By using the measurements from at least one receiver 132, information handling system 126 and/or downhole information handling system 128 may be used to determine distance and direction to conductive member 112. The information handling system 126 and/or downhole information handling system 128 may further use the information concerning the rotational orientation of the magnetic source (e.g., magnetic assembly 136) in the distance and direction determination.

Information handling system 126 (e.g., surface system) may include a keyboard, a mouse, and/or a video display. Information handling system 126 may communicate with electromagnetic ranging tool 124 through a communication line (not illustrated) disposed in (or on) conveyance 118. Wireless communication may be used to transmit information back and forth between information handling system 126 and electromagnetic ranging tool 124. While not illustrated, the electromagnetic ranging tool 124 may include one or more additional components, such as analog-to-digital converter, filter and amplifier, among others, that may be used to process the measurements of the electromagnetic ranging tool 124 before they may be transmitted to surface 110. Alternatively, raw measurements from electromagnetic ranging tool 124 may be transmitted to surface 110. Any suitable technique may be used for transmitting signals from electromagnetic ranging tool 124 to surface 110, including, but not limited to, wired pipe telemetry, mud-pulse telemetry, acoustic telemetry, and electromagnetic telemetry. While not illustrated, electromagnetic ranging system 102 may comprise BHA 122 which may include a telemetry subassembly that may transmit telemetry data to the surface 110. A transmitter in the telemetry subassembly may be operable to generate pressure pulses in the drilling fluid that may propagate along the fluid stream to surface 110. Electromagnetic ranging system 102 may also comprise digitizer 133 and communication link 134. At surface 110, pressure transducers (not shown) may convert the pressure signal into electrical signals for digitizer 133. Digitizer 133 may supply a digital form of the telemetry signals to information handling system 126 via a communication link 134, which may be a wired or wireless link. The telemetry data may be analyzed and processed by information handling system 126. For example, the telemetry data could be processed to determine a location of target wellbore 104. With the location of target wellbore 104, a driller may control the BHA 122 while drilling second wellbore 114 to intentionally intersect target wellbore 104, avoid target wellbore 104, and/or drill second wellbore 114 in a path parallel to target wellbore 104.

Both information handling systems (e.g., information handling system 126 and downhole information handling system 128) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. Both information handling systems may also include one or more buses operable to transmit communications between the various hardware components. Both information handling systems may include a computer, a network storage device, or any other suitable device and may vary in size, shape, performance, functionality, and price. Both information handling systems may include random access memory (RAM), one or more processing resources such as a central processing unit (CPU) or hardware or software control logic, ROM, and/or other types of nonvolatile memory. Both information handling systems may include a microprocessor or other suitable circuitry, for receiving and processing signals received by the electromagnetic ranging tool 124. Additional components of the information handling systems may include one or more disk drives, one or more network ports for communication with external devices as well as various input and output (I/O) devices.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

As described above, at least one receiver 132 may be capable of measuring at least one independent component of the magnetic gradient tensor, and/or at least one vector component of the magnetic field. The magnetic gradient tensor may be formed from the spatial derivatives of the magnetic vector components:

$$\hat{B} = \begin{bmatrix} B_{xx} & B_{xy} & B_{xz} \\ B_{yx} & B_{yy} & B_{yz} \\ B_{zx} & B_{zy} & B_{zz} \end{bmatrix}, \text{ where } B_{ij} = \partial B_i / \partial j.$$

The receiver 132 may rotate synchronously with the magnet assembly 136 and may produce a response at twice the frequency of rotation, and with amplitudes that may depend upon the distance to an adjacent well (e.g., target wellbore 104). For typical drilling rotations of up to about 120 revolutions per minute to about 300 revolutions per minute (e.g., about 300 revolutions per minute) (e.g., about 1 Hz to about 10 Hz), a low frequency (e.g., quasi-static) approximation may be used to assume the magnetic field response are comparable to the static or direct current ("DC") response. In such case, the magnetic gradient tensor is rotationally invariant, symmetric and with zero trace; thus, reducing to five independent tensor components. Unlike high frequency electromagnetic ranging systems, this quasi-static approach may be advantageous as it is insensitive to formation resistivity and anisotropy.

The receivers 132 may be formed from the spatial separation (or finite difference) between them, $B_{ij} \approx \Delta B_i / \Delta j$. For example, two receivers 132 (e.g., fluxgate magnetometers) may be spaced by any suitable distance, such as, for example, about 1 inch (2.5 cm) to about 7 inches (17.8 cm) across the diameter of an insert. In such case, receivers 132 with a sensitivity of about 5 picoteslas ("pT") to about 15 pT may correspond to a magnetic gradient sensitivity of about 115 pT/m to about 135 pT/m. Alternatively, superconducting quantum interference devices ("SQUIDs") may be used in place of fluxgate magnetometers. The SQUIDs may be either liquid nitrogen-cooled high temperature SQUIDs ("HTS") or liquid helium-cooled low temperature SQUIDs ("LTS"). The SQUIDs cryogenic chamber may be configured with a heat transfer device, such that the SQUIDs may operate in ambient temperatures from about 0° C. to about 200° C. In such case, HTSs with a sensitivity of about 50 femtoteslas ("fT") to about 150 fT may correspond to a magnetic gradient sensitivity of about 5 pT/m to about 20 pT/m. A magnetic gradiometer may be formed from a static configuration of receivers 132 or may be a dynamic configuration of receivers 132. Additionally, the gradient field may be measured by rotating receiver 132, so that it may measure the magnetic field at different locations (e.g., while rotating) and then information handling system 126 and/or downhole information handling system 128 may calculate the gradient of the measurements.

Since the measurements of receivers 132 that are non-rotating may receive double the frequency of the frequency of a receiver 132 that rotates, the target casing signal may be separated from the direct signal and from the receiver 132 that rotates. Therefore, only one receiver 132 may be deployed, but may take two measurements at two different depths along the BHA 122 to enable a gradient field relative to the target casing (e.g., conductive member 112). When the target casing (e.g., conductive member 112) is parallel to the BHA 122, the derivatives of the magnetic field along the tool axis may be zero, while the other components of the gradient tensor may not be zero. This may indicate not making contact with the casing. When in a T intersection, the gradient field enabled by the two measurements at two different depths from only one receiver 132 may be sufficiently strong to determine relative position between a receiver 132 that rotates and the target casing. Additionally, a receiver (e.g., a magnetic gradiometer) may take measurements at two or more different depths.

In alternate BHA configurations, a receiver 132 may be located above or below a mud motor (not shown) in a BHA 122. Where located below a mud motor, a short hop communication may be included for telemetry of the data to the BHA 122, and for telemetry to the surface 110. Where the magnet assembly 136 is deployed below a mud motor, the magnet assembly 136 may rotate at a different frequency (e.g., depending on drilling) than the receiver 132.

The data may be processed for a range and direction to an adjacent well (e.g., target wellbore 104) via any number of processing techniques, such as, but not limited to, Euler deconvolution, eigenvalue analysis, or migration. Additional techniques may include inverse modeling based on analytical forward solutions, Werner Deconvolution, use of analytical signal representations with Hilbert Transforms, and migration. The data processing may be performed downhole in the BHA 122 (e.g., downhole information handling system 128), and/or at surface 110 (e.g., information handling system 126). The surface processing may be performed remotely from the well site, whereby computers at the well site may be connected to remote processing computers via a network.

For example, Euler deconvolution has previously been used for interpreting depth to source for gridded (or otherwise large-scale) potential field surveys. The technique may be based on the solution of Euler's homogeneous equation for total magnetic intensity ("TMI") B:

$$(x - x_0)\frac{\partial B}{\partial x} + (y - y_0)\frac{\partial B}{\partial y} + (z - z_0)\frac{\partial B}{\partial z} = -n(B - R), \quad (1)$$

where n is Euler's structural index (SI), and R is the regional magnetic field. A variant of Equation (1) also applies to magnetic gradients:

$$(x - x_0)\frac{\partial B_x}{\partial x} + (y - y_0)\frac{\partial B_x}{\partial y} + (z - z_0)\frac{\partial B_x}{\partial z} = -nB_x, \quad (2)$$

$$(x - x_0)\frac{\partial B_y}{\partial x} + (y - y_0)\frac{\partial B_y}{\partial y} + (z - z_0)\frac{\partial B_y}{\partial z} = -nB_y, \quad (3)$$

$$(x - x_0)\frac{\partial B_z}{\partial x} + (y - y_0)\frac{\partial B_z}{\partial y} + (z - z_0)\frac{\partial B_z}{\partial z} = -nB_z, \quad (4)$$

where the regional fields are (approximated by) zero. We assemble (2) to (4) into the linear system:

$$\begin{bmatrix} B_{xx} & B_{xy} & B_{xz} \\ B_{yx} & B_{yy} & B_{yz} \\ B_{zx} & B_{zy} & B_{zz} \end{bmatrix} \begin{bmatrix} x - x_0 \\ y - y_0 \\ z - z_0 \end{bmatrix} = -n \begin{bmatrix} B_z \\ B_y \\ B_z \end{bmatrix}, \quad (5)$$

and solve as:

$$\begin{bmatrix} x - x_0 \\ y - y_0 \\ z - z_0 \end{bmatrix} = -n \begin{bmatrix} B_{xx} & B_{xy} & B_{xz} \\ B_{yx} & B_{yy} & B_{yz} \\ B_{zx} & B_{zy} & B_{zz} \end{bmatrix}^{-1} \begin{bmatrix} B_z \\ B_y \\ B_z \end{bmatrix}, \quad (6)$$

where $B_{ij} = \partial B_i/\partial j$. Based on Equation (6), the distance and direction (as a radial vector) may be solved from receiver 132 to the adjacent well (e.g., target wellbore 104), independent of the magnetization parameters of the adjacent well. The Euler SI may be known a priori, implying Equation (6) may be solved from data of one receiver 132 in the BHA 122 and one position in the well path (i.e., one measured depth). Alternatively, the Euler SI may be unknown, and calculated from a least squares fit of Equation (6) for two or more receiver positions; whether as two receivers 132 in a BHA 122, or two positions of the same receiver at two positions in the well path (i.e., at two measured depths).

Figures 2A, 2B, 2C:
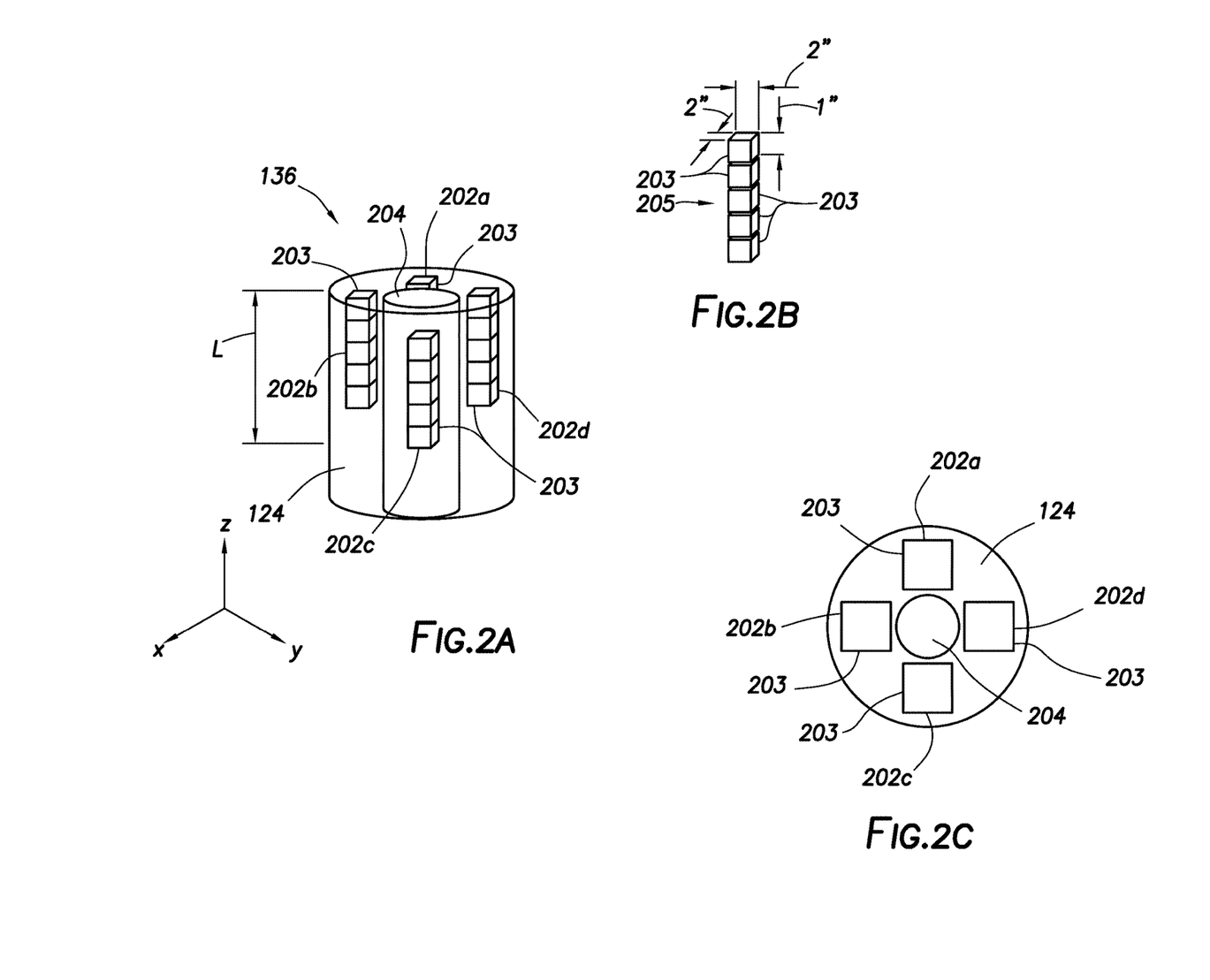
FIG. 2A is a schematic illustration an example of a permanent magnet assembly including a juxtaposition of magnets.
FIG. 2B is a schematic illustration of an example of stacked magnets.
FIG. 2C is a schematic illustration of an example of a cross section of the permanent magnet assembly shown in FIG. 2A.

As illustrated in FIGS. 2A-2C, magnet assembly 136 may include permanent magnet arrays 202a, 202b, 202c, and 202d. The permanent magnet arrays 202a, 202b, 202c, and 202d may be arranged in the magnet assembly 136 to provide a preferred magnetization direction. The magnet assembly 136 may be formed from any suitable magnets, including, but not limited to, cylindrical magnets, ring magnets, bar magnets or combinations thereof. Given high temperature conditions of drilling environments (e.g., from about 0° C. up to about 200° C.), permanent magnet arrays 202a, 202b, 202c, and 202d may be constructed from any suitable material, such as, for example, rare earth magnets (e.g., $Sm_2Co_{17}$). Each permanent magnet array 202a, 202b, 202c, and 202d may comprise smaller permanent magnets 203 of any suitable size, such as, for example, 2 inches×2 inches×1 inch (5 centimeters×5 centimeters×2.5 centimeters) arranged in stacks and positioned around a flow bore 204 (e.g., mud flow through electromagnetic ranging tool 124) of electromagnetic ranging tool 124. The size of each permanent magnet array 202a, 202b, 202c, and 202d may be constrained by the BHA design, tool design and/or mechanical properties. The smaller permanent magnets 203 may be stacked (e.g., stacks 205) vertically along a length L of flow bore 204 of electromagnetic ranging tool 124, as illustrated in FIG. 2B. Flow bore 204 may comprise any suitable diameter, such as, for example, about 1 inch to about 4 inches. The diameter of electromagnetic ranging tool 124 may comprise any suitable diameter, such as, for example, about 4 inches (10.2 cm) to about 10 inches (25.4 cm). A thin (e.g., order of mm) fiber glass layer (not shown) may be disposed between the smaller permanent magnets 203 in each of permanent magnet arrays 202a, 202b, 202c, and 202d. Each of permanent magnet arrays 202a, 202b, 202c, and 202d may be manufactured with a magnetization direction of any suitable angle, such as, for example, about 30° to about 60° relative to the z-axis of the BHA 122, such that their juxtaposition within electromagnetic ranging tool 124, which may be a non- or low magnetically permeable (e.g., $\mu_r=1.0013$), forms a high magnetic moment. Similar permanent magnetic assemblies may be constructed for LWD nuclear magnetic resonance ("NMR") tools. The direction of the magnetization may be chosen to ensure azimuthal sensitivity, as the BHA 122 rotates. Azimuthal sensitivity may include a sensitivity to the earth/structures at different azimuths, as the electromagnetic ranging tool 124 rotates. Alternatively, the magnet assembly 136 may be packaged as an assembly, such as for example, an insert or sonde (not shown). The assembly may slide into a collar (e.g., electromagnetic ranging tool 124)—whether against an inner diameter of the collar, such that mud flows through it (as an insert), or as a sonde down the middle of the collar, such that mud flows between an outer diameter of the sonde and inner diameter of the collar.

Figure 3A:
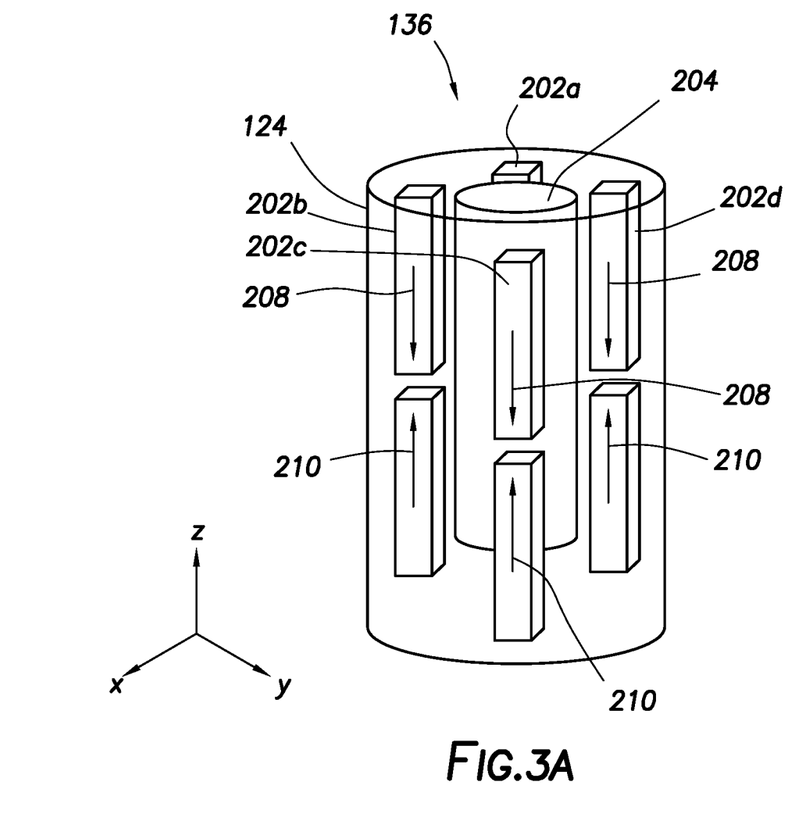
FIGS. 3A and 3B are schematic illustrations of example magnet configurations with directional external magnetization, formed from the superposition of magnets with unidirectional magnetization.
Figure 3B:
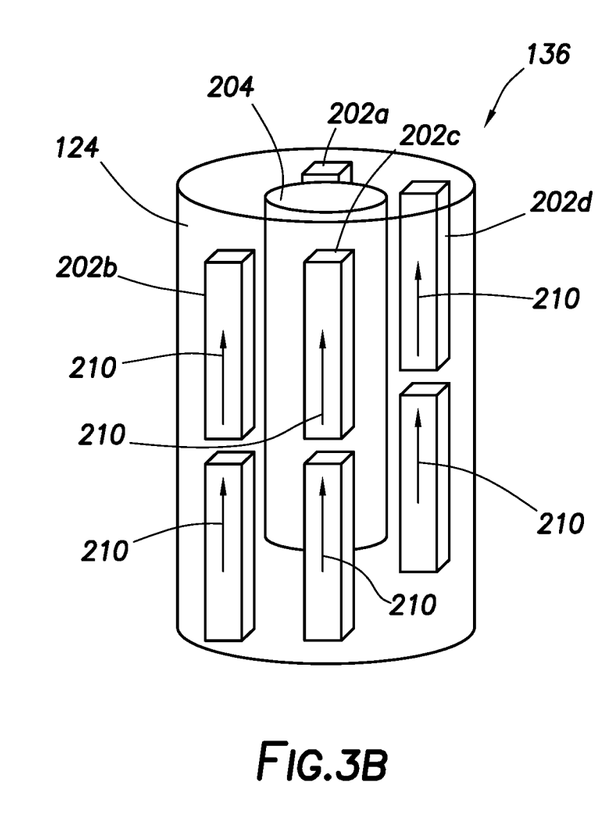

As shown in FIGS. 3A and 3B, magnet assembly 136 may include magnet configurations with directional external magnetization that may be formed from the superposition of magnets (e.g., permanent magnet arrays 202a, 202b, 202c, and 202d) with uni-directional magnetization. The magnetization direction (e.g., directions 208, 210) may be designed from the superposition of magnets, and/or may be enhanced by the superposition of magnets, thereby focusing a magnetic field that may allow a higher sensitivity to a smaller volume of earth.

Figure 4A:
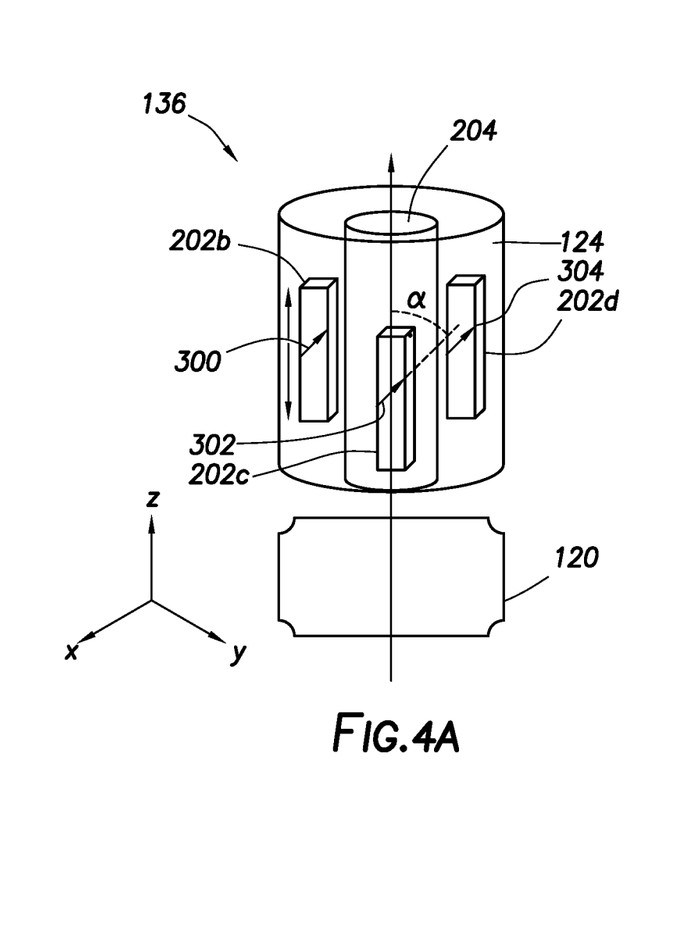
FIG. 4A is a schematic illustration of an example of a permanent magnet assembly including a juxtaposition of magnets with a magnetization direction.
Figure 4B:
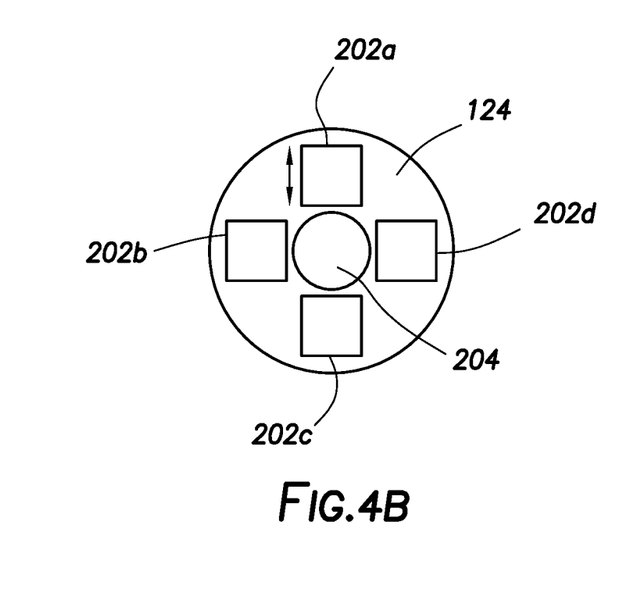
FIG. 4B is a schematic illustration of an example of a cross section of the permanent magnet assembly shown in FIG. 4A.

As illustrated in FIGS. 4A and 4B, the permanent magnet arrays 202a, 202b, 202c, and 202d may be arranged on electromagnetic ranging tool 124 to have a magnetization direction (e.g., magnetization directions 300, 302, 304) with any suitable angle α, such as, for example, about 30° to about 60° with respect to the z-axis of the BHA 122 (as shown on FIG. 1). The magnetization direction may be one of the factors instrumental in shaping the magnetic field at a desired ranging distance from the electromagnetic ranging tool 124. If, for example, the magnetization direction were entirely along the axis (e.g., z axis) of the electromagnetic ranging tool 124, and the electromagnetic ranging tool 124 was parallel to the target wellbore 104, even though the changing magnetic flux may induce a signal in the target wellbore 104, that signal may be a constant current if the rate of rotation of the electromagnetic ranging tool 124 is constant; no signal may be observed at 2x the rotational frequency of the electromagnetic ranging tool 124. With the magnetic moment at a significant angle with respect to the axis of the electromagnetic ranging tool 124, a signal may be generated that, when received in the rotating electromagnetic ranging tool 124, may be at 2x the rotational speed. Angles in the range of about 30° to about 60° may be utilized, although other angles (other than 0°) may be utilized.

The magnet assembly 136 may determine a volume of earth that is being magnetized. The magnet assembly 136 may be located as close to drill bit 120 as possible (e.g., directly behind the drill bit 120 to about 2 feet (0.6 m) behind the drill bit 120), so as to excite an adjacent well from a large as possible distance from drill bit 120 (e.g., at least about 20 feet (6.1 m), such as, about 20 feet (6.1 m) to about 40 feet (12.2 m)). In other BHA configurations, the magnet assembly 136 may be located above or below a motor section, e.g., a mud motor, (not shown) in a BHA 122 (shown on FIG. 1).

Figure 5A:
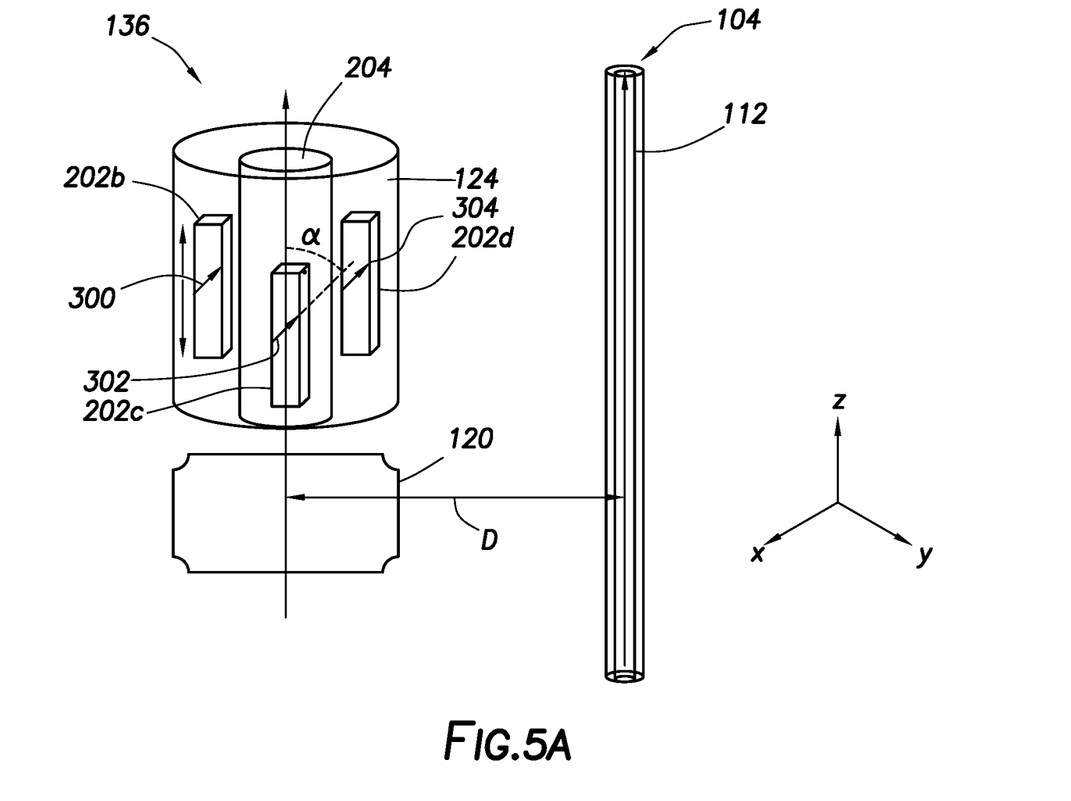
FIG. 5A illustrates an example of a model configuration.
Figure 5B:
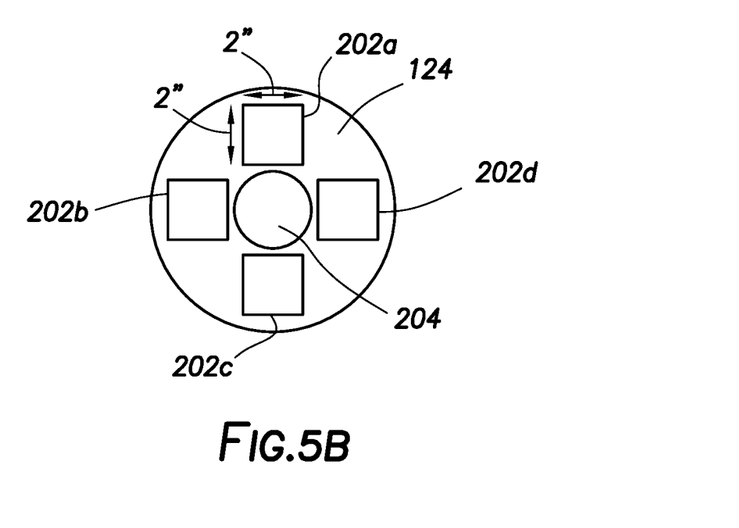
FIG. 5B illustrates an example of a cross section of the model configuration shown in FIG. 5A.
Figure 6A:
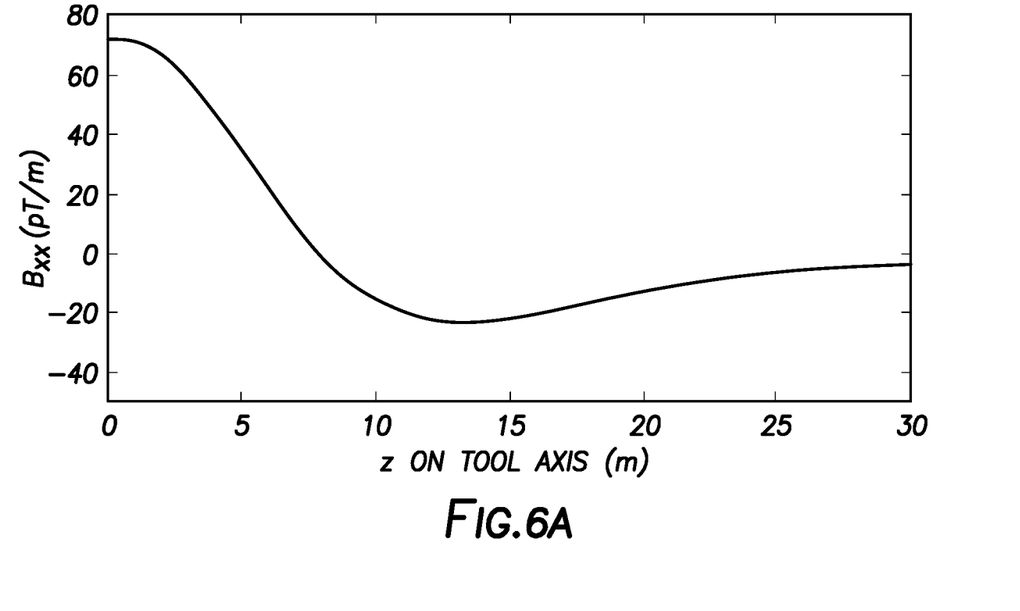
FIGS. 6A-6D illustrate example graphs of magnetic gradient components for the model in FIG. 5A, where the permanent magnets are magnetized perpendicular to the bottom-hole assembly axis.
Figure 6B:
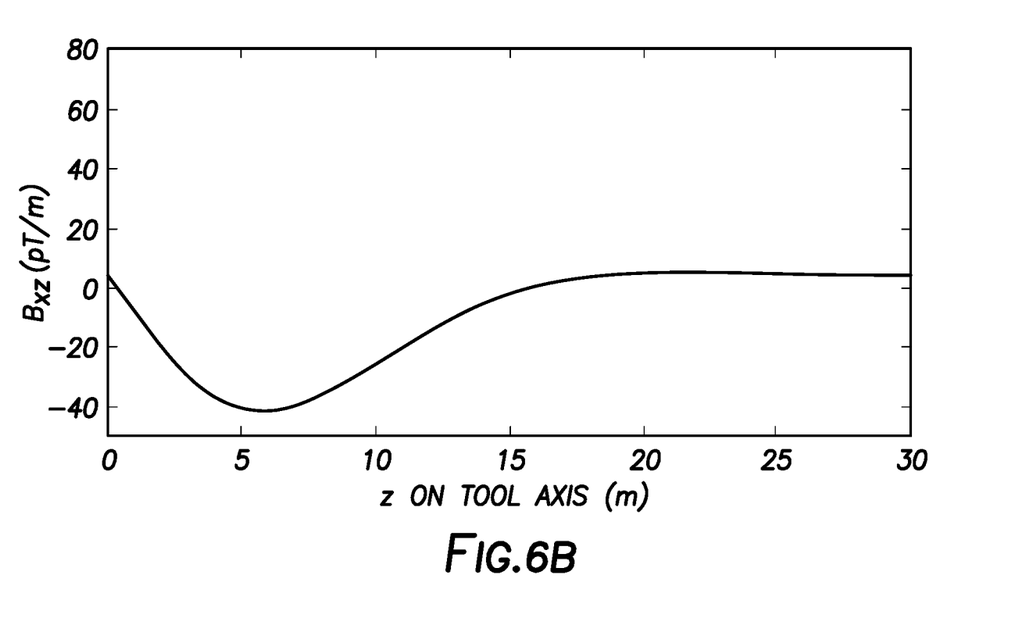
Figure 6C:
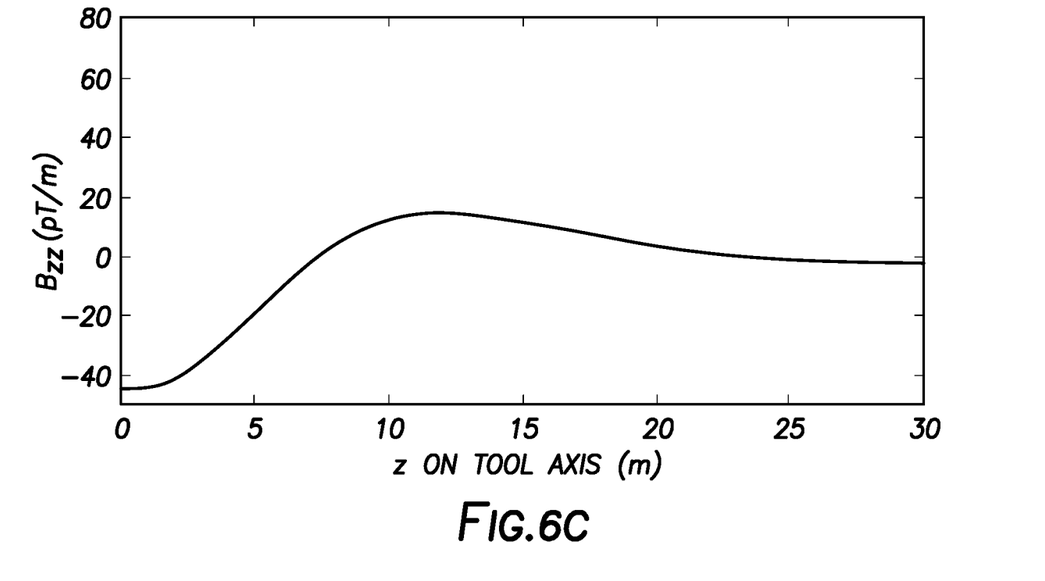
Figure 6D:
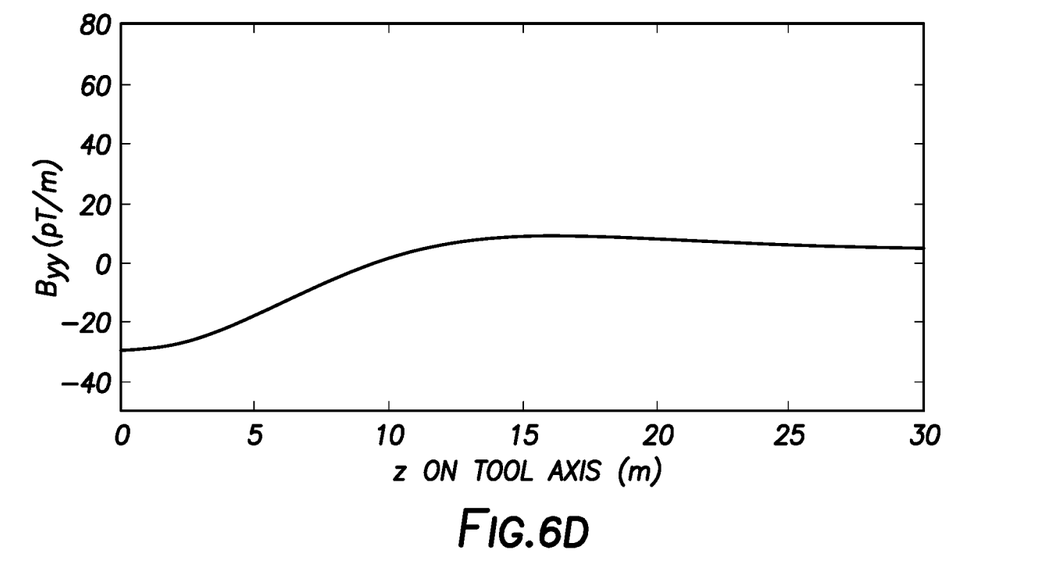

FIGS. 5A and 5B illustrate an example configuration of magnet assembly 136 on electromagnetic ranging tool 124. Electromagnetic ranging tool 124 may be characterized by a very low resistivity of about $1.25 \times 10^{-6}$ Ωm and a relative magnetic permeability ($\mu_r$) of about 1 to about 60 (e.g., about 1.0013). The diameter of the electromagnetic ranging tool 124 may about 4 inches (10 cm) to about 10 inches (25 cm). The magnet assembly 136 may be at distance D (e.g., about 16 feet (5 meters) to about 49 feet (15 meters)) from and parallel to a 4 inches (10 cm) to about 10 inches (25 cm) steel casing (e.g., conductive member 112) of an adjacent well (e.g., target wellbore 104). The BHA 122 may contain magnet assembly 136 above the drill bit 120. The magnetic field gradients may be measured along a BHA axis (e.g., z axis). Conductive member 112 may be characterized by an electrical conductivity (σ) of about $10^6$ S/m and a magnetic permeability ($\mu_r$) of about 20 to about 100 (e.g., about 60). Conductive member 112 may comprise an inner diameter from about 6 inches (15 cm) to about 10 inches (25 cm), and an outer diameter from about 7 inches (18 cm) to about 11 inches (28 cm); however, conductive member 112 may also have dimensions outside these ranges. Conductive member 112 may comprise a length of about 20 meters to about 80 meters. Flow bore 204 may include a resistivity of about $1 \times 10^{-6}$ Ωm to about $5 \times 10^{-6}$ Ωm (e.g., about $2 \times 10^{-6}$ Ωm) and a magnetic permeability ($\mu_r$) of about 1 to about 5. The flow bore 204 may have a resistivity of a drilling mud.

The diameter of the flow bore 204 may be about 1 inch (2.5 cm) to about 4 inches (10.2 cm). Permanent magnet arrays 202a, 202b, 202c, and 202d may comprise a length of about 20 inches to about 30 inches (about 51 cm to about 76 cm) and a thickness of about 1 inch to about 5 inches (about 2.5 cm to about 13 cm).

FIGS. 6A-6D illustrate graphs depicting magnetic gradient components measured along the BHA axis (e.g., z-axis) above the magnet assembly 136, where the magnet assembly 136 may be magnetized perpendicular to a BHA axis. FIGS. 6A-6D show measurements as the inclination between the BHA axis and wells change. The independent magnetic gradient components may be above about 10 pT/m, and may be measured with a HTS gradiometer with peak signal-to-noise ratio greater than about 300. As illustrated on FIGS. 6A-6D, measurements may be made for adjacent wells from at least about 10 meters from the BHA 122 (as shown on FIG. 1).

The systems and methods may include any of the various features of the systems and methods disclosed herein, including one or more of the following statements.

Statement 1: A method for ranging-while-drilling may comprise employing a rotating magnet assembly to induce a changing magnetization and/or electric current in a conductive member disposed in a target wellbore, wherein the rotating magnet assembly may be employed in a second wellbore; measuring at least one component of a magnetic gradient tensor using receivers; and calculating a relative location of the conductive member based at least in part on the measurements of the at least one component of the magnetic gradient tensor.

Statement 2: The method of Statement 1, wherein the rotating magnet assembly may comprise a permanent magnet and/or an electromagnet.

Statement 3: The method of Statement 1 or Statement 2, wherein the conductive member may be a casing string.

Statement 4: The method of any preceding statement, wherein in the rotating magnet assembly may comprise a magnet array, wherein the magnet array may be configured to provide a magnetization direction.

Statement 5: The method of any preceding statement, wherein the magnet array may comprise stacked magnets.

Statement 6: The method of any preceding statement, further comprising measuring at least one vector component of a magnetic field with the receivers.

Statement 7: The method of any preceding statement, further comprising rotating the rotating magnet assembly up to about 300 revolutions per minute.

Statement 8: The method of any preceding statement, wherein the rotating magnet assembly may be positioned on a bottom hole assembly.

Statement 9: The method of any preceding statement, wherein the rotating magnet assembly may be positioned about 2 feet to about 40 feet from a drill bit.

Statement 10: A method for ranging while drilling may comprise employing a rotating magnet assembly, wherein the rotating magnet assembly may induce a changing magnetic moment and/or electric current in a conductive member disposed in a target wellbore, wherein the rotating magnet assembly may be employed in a second wellbore; measuring at least two measurements using magnetic sensors at two different positions along the second wellbore; calculating a gradient field from the at least two measurements; and calculating a relative location of the conductive member based at least in part on the at least two measurements of the magnetic sensors.

Statement 11: The method of Statement 10, wherein the rotating magnet assembly may comprise a permanent magnet and/or an electromagnet.

Statement 12: The method of Statement 10 or Statement 11, wherein the rotating magnet assembly may comprise permanent magnets positioned around a flow bore of an electromagnetic ranging tool.

Statement 13: The method of any one of Statements 10 through 12, wherein the rotating magnet assembly may comprise a magnet array, wherein the magnet array may comprise stacked magnets.

Statement 14: An electromagnetic ranging system may comprise an electromagnetic ranging tool disposed on a drill string, wherein the electromagnetic ranging tool may comprise a magnetic source that may induce a changing magnetization and/or an electric current in a conductive member and a receiver operable to measure at least one component of a magnetic gradient tensor; and an information handling system operable to determine a relative location of the conductive member from measurements by the receiver.

Statement 15: The system of Statement 14, wherein the magnetic source may comprise a rotating magnet assembly.

Statement 16: The system of Statement 14 or Statement 15, wherein the rotating magnet assembly may comprise a permanent magnet and/or an electromagnet.

Statement 17: The system of any one of Statements 14 through 16, wherein the magnetic source may comprise $Sm_2Co_{17}$.

Statement 18: The system of any one of Statements 14 through 17, wherein the magnetic source may comprise a magnet array.

Statement 19: The system of any one of Statements 14 through 18, wherein the magnet array may comprise stacked magnets.

Statement 20: The system of any one of Statements 14 through 19, wherein the stacked magnets may be positioned around a flow bore of the electromagnetic ranging tool.

The preceding description provides various examples of the systems and methods of use disclosed herein which may contain different method steps and alternative combinations of components. It should be understood that, although individual examples may be discussed herein, the present disclosure covers all combinations of the disclosed examples, including, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for ranging-while-drilling comprising:
    employing a rotating magnet assembly to induce a changing magnetization and/or electric current in a conductive member disposed in a target wellbore, wherein the rotating magnet assembly is employed on a bottom-hole-assembly (BHA) disposed in a second wellbore, the rotating magnet assembly comprising a plurality of magnet arrays configured to provide a magnetization direction, and wherein the magnetization direction is oriented at an angle between thirty degrees and sixty degrees with respect to a central axis of the BHA;
    measuring at least one component of a magnetic gradient tensor using receivers employed at one or more locations of the BHA; and
    calculating a relative location of the conductive members with respect to the BHA based at least in part on the measurements of the at least one component of the magnetic gradient tensor.

2. The method of claim 1, wherein the rotating magnet assembly comprises a permanent magnet and/or an electromagnet.

3. The method of claim 1, wherein at least one of the two or more conductive members is a casing string.

4. The method of claim 1, further comprising measuring at least one vector component of a magnetic field with the receivers.

5. The method of claim 1, further comprising rotating the rotating magnet assembly up to about 300 revolutions per minute.

6. The method of claim 1, wherein the rotating magnet assembly is positioned on a bottom hole assembly.

7. The method of claim 1, wherein the rotating magnet assembly is positioned about 2 feet to about 40 feet from a drill bit.

8. A method for ranging while drilling comprising:
    employing a rotating magnet assembly, wherein the rotating magnet assembly induces a changing magnetic moment and/or electric current in a conductive members disposed in a target wellbore, wherein the rotating magnet assembly is employed on a bottom-hole-assembly (BHA) disposed in a second wellbore, the rotating magnet assembly comprising a plurality of magnet arrays configured to provide a magnetization direction, and wherein the magnetization direction is oriented at an angle between thirty degrees and sixty degrees with respect to a central axis of the BHA;

measuring one or more components of a magnetic gradient tensor using rotating magnetic sensors at two different positions along the second wellbore;

calculating a gradient field from the one or more components of the magnetic gradient tensor; and calculating a relative location of the conductive members with respect to the BHA based at least in part on the at least two measurements of the magnetic sensors.

9. The method of claim 8, wherein the rotating magnet assembly comprises a permanent magnet and/or an electromagnet.

10. The method of claim 9, wherein the rotating magnet assembly comprises permanent magnets positioned around a flow bore of an electromagnetic ranging tool.

11. An electromagnetic ranging system comprising:

an electromagnetic ranging tool disposed on a drill string, wherein the electromagnetic ranging tool comprises a magnetic source that induces a changing magnetization and/or an electric current in a conductive members and a receiver operable to measure at least one component of a magnetic gradient tensor, wherein the magnetic source comprises a rotating magnet assembly, the rotating magnet assembly comprising a plurality of magnet arrays configured to provide a magnetization direction, and wherein the magnetization direction is oriented at an angle between thirty degrees and sixty degrees with respect to a central axis of the BHA; and an information handling system operable to determine a relative location of the conductive members with respect to the drill string from one or more components of a magnetic gradient tensor measured by the receiver.

12. The electromagnetic ranging system of claim 11, wherein the rotating magnet assembly comprises a permanent magnet and/or an electromagnet.

13. The electromagnetic ranging system of claim 11, wherein the magnetic source comprises $Sm_2Co_{17}$.

14. The electromagnetic ranging system of claim 11, wherein the plurality of magnet arrays are positioned around a flow bore of the electromagnetic ranging tool.

* * * * *

UNITED STATES PATENT AND TRADEMARK OFFICE
CERTIFICATE OF CORRECTION

PATENT NO.        : 10,767,466 B2
APPLICATION NO.   : 15/546235
DATED             : September 8, 2020
INVENTOR(S)       : Glenn Andrew Wilson et al.

Page 1 of 1

It is certified that error appears in the above-identified patent and that said Letters Patent is hereby corrected as shown below:

In the Claims

Column 12 Line 36, Claim 1 change "conductive members" to --conductive member--.
Column 12 Lines 59-60, Claim 8 change "conductive members" to --conductive member--.
Column 13 Line 6, Claim 8 change "conductive members" to --conductive member--.

Signed and Sealed this
Twenty-second Day of December, 2020

Andrei Iancu
*Director of the United States Patent and Trademark Office*